(12) United States Patent
Schneider

(10) Patent No.: US 6,684,217 B1
(45) Date of Patent: Jan. 27, 2004

(54) SYSTEM AND METHOD FOR GENERATING A PROFILE FROM WHICH A PUBLICATION MAY BE CREATED

(75) Inventor: Robert Schneider, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 447 days.

(21) Appl. No.: 09/718,291

(22) Filed: Nov. 21, 2000

(51) Int. Cl.[7] .............................. G06F 17/00; G06F 7/00
(52) U.S. Cl. .......................................................... 707/102
(58) Field of Search ............................... 707/3, 10, 102; 345/700

(56) References Cited

U.S. PATENT DOCUMENTS

| | | | |
|---|---|---|---|
| 5,530,852 A | 6/1996 | Meske, Jr. et al. | 709/206 |
| 5,761,662 A | 6/1998 | Dasan | 707/10 |
| 5,890,152 A * | 3/1999 | Rapaport et al. | 707/6 |
| 6,029,195 A * | 2/2000 | Herz | 725/116 |
| 6,052,714 A * | 4/2000 | Miike et al. | 709/217 |
| 6,199,067 B1 * | 3/2001 | Geller | 707/10 |
| 6,424,968 B1 * | 7/2002 | Broster et al. | 707/3 |
| 6,484,164 B1 * | 11/2002 | Nikolovska et al. | 707/3 |
| 6,513,039 B1 * | 1/2003 | Kraenzel | 707/9 |
| 6,539,375 B2 * | 3/2003 | Kawasaki | 707/5 |

FOREIGN PATENT DOCUMENTS

| | | |
|---|---|---|
| EP | 0902383 | 3/1999 |
| EP | 1026607 | 8/2000 |
| WO | WO01/60071 | 8/2001 |

OTHER PUBLICATIONS

"Aspen Administration Utility", Aspen Reasearch Group Documentation, Jan. 5, 2000, p.45.*

* cited by examiner

*Primary Examiner*—Greta Robinson
*Assistant Examiner*—Susan Rayyan

(57) ABSTRACT

A system and method are provided for generating a personal profile from which an on-line publication may be generated. The system includes a processor circuit having at least one processor and at least one memory. The system also includes profile building logic stored on the at least one memory and executable by the at least one processor. The profile building logic includes logic to identify a role model profile in a profile database, logic to copy the role model profile into a client profile, and logic to save the client profile in the profile database. The role model profile includes a number of parameters to be consulted to generate an on-line publication.

17 Claims, 6 Drawing Sheets

To create your own personal paper, you have to enter your personal profile that will be used to identify the daily content of your paper. Below you have the option of creating your own profile by clicking on "My Own". Otherwise, you can copy the preferences of a famous person you respect by clicking on "Copy" to incorporate the famous person's preferences that you can further edit.

253

My Own    Specify your own preferences

Copy    Copy another paper

256

186a

SYSTEM AND METHOD FOR GENERATING A PROFILE FROM WHICH A PUBLICATION MAY BE CREATED

TECHNICAL FIELD

The present invention is generally related to the field of on-line publishing and, more particularly, is related to a system and method for generating a profile from which a publication may be created.

BACKGROUND OF THE INVENTION

In the mid 1400's, Johann Gutenberg revolutionized how information is disseminated through his invention of the movable type press. With the publication of the Mazarin Bible, documents that were once held in the exclusive domain of a chosen few were now widely available to the masses. Nearly 550 years later, the mass media revolution that Gutenburg started is alive and well, complete with newspapers such as the New York Times and the Washington Post, magazines such as Newsweek and Sports Illustrated, and literally thousands upon thousands of other publications.

While these thousands of publications cover a wide range of interests, from news to sports to fashion to model rocketry, they do have one aspect in common. This common aspect is the fact that they are intended to be read by a mass market. In the pre-Gutenberg days, a document would literally be read by only one person or a very small number of people. Currently, it is not economically viable for today's publications to have such a small readership. This is due at least in part to high marketing, production and distribution costs. In fact, many of today's publications are funded to a very large extent by the advertising contained within them. These advertisers are attracted to publications that can consistently deliver a large, reliable audience of consumers that are exposed to their advertising.

While this mass-market publication model has worked well for hundreds of years, it is not without its problems. One such problem is that a typical reader of a publication has a wide variety of interests. Consequently, no single mass-market publication will be able to satisfy all these interests. For example, a reader who is interested in international news, golf, fly-fishing, genealogy, and computers may have to subscribe to several different publications to satisfy these interests. Since these publications are intended for a mass market, they inevitably contain a significant amount of material including articles, advertising, and other content that does not hold our reader's interest. Our reader generally ignores such material resulting in a significant amount of wasted paper. Advertisers know this, and agree to pay considerably less to mass market magazine or newspaper per 1000 exposures to their ad than they would pay to a direct-mail generator. This is because the direct-mail generator can provide a more specific guarantee that the people exposed to their ad are of demographic group that will be much more likely to read their ad and be interested in it.

In addition, it is neither cost-effective nor time effective for most readers to subscribe to and/or read a large number of publications. Generally, the typical reader will only subscribe to a few publications that are of the most interest to them. The reader reduced readership level of the publications our typical reader chooses not to subscribe to, even though he would be interested in at least some of the editorial and advertising content contained inside, means that the publication receives less subscription and advertising revenue than they otherwise would. If many other readers make the same decision, the continued viability of the publication may be in jeopardy, and the publication may be forced to go out of business. In fact, many publications do go out of business yearly for failing to attract a sustaining number of advertisers and readers. This is the case even if there are a large number of readers that would be interested in reading their publication, and a corresponding number of advertisers anxious to have these readers exposed to their ads. In general, publications that fail to attract a substantial mass market of people willing to pay for and/or read them cease publication. This is a shame, since many of these publications would enrich the diversity of information available to all readers, and would provide an avenue for lesser known writers and artists to practice their wares.

In more recent years, a new type of publication has emerged, namely, the electronic publication. Readers of these publications typically sign onto the Internet through their computer, and read the publications on-line. Some of these publications, such as CNN.com and pointcast.com, allow users to state personal preferences on what type of material they want to read. Often, these personalized electronic publications include advertising, usually in the form of a banner ad that is placed on the top of the screen.

While these electronic publications have been an interesting development in the distribution of information, they still represent a tiny fraction of the information that is published under the more traditional post-Gutenburg model. Many readers of these electronic publications complain that they are very difficult to read, especially for long periods of time. While it might be convenient for a reader to sign onto the Internet to look at the CNN.com web site for a brief summary of late breaking news, this reader would most likely only spend a few minutes at the site. This reader is also still likely to subscribe to the more traditional print media such as Newsweek or the Washington Post. Additionally, this reader also would likely spend significantly more time reading the more traditional printed publication than an electronic publication, and correspondingly, spend more time being exposed to the ads in the traditional printed publication. Accordingly, printed publications continue to flourish today more than five centuries after Gutenberg made them possible.

In addition, another problem presents itself for electronic publications. For a given interest of a particular reader, there may be potentially thousands of related articles, advertisements, and other content items. The average reader is simply not going to be able to read all of the potential content items that hold their interest on a daily basis. Therefor, it is necessary to create a filter that is used to narrow the potential content items to a select few that are presented to the reader. Such a filter is usually relatively extensive so as to ensure that the total number of potential content items can be effectively narrowed down to the select few that are presented to the reader. To create such a filter, the reader may fill out a questionnaire, for example, as to their particular interests, etc. Unfortunately, due to the significant amount of limiting information needed for an effective filter, it may take a rather long time for the reader to accomplish this task. Unfortunately, the reader may lose patience with the process, resulting in a failure to complete the filter or in an inaccurate filter.

SUMMARY OF THE INVENTION

In light of the foregoing, the present invention provides for a system and method for generating a personal profile. In one embodiment, the system includes a processor circuit having at least one processor and at least one memory. The system also includes profile building logic stored on the at least one memory and executable by the at least one processor. The profile building logic includes logic to identify a role model profile in a profile database, logic to copy the role model profile into a client profile, and logic to save the client profile in the profile database. The role model profile includes a number of parameters to be consulted to generate an on-line publication.

Broadly stated, the method for generating a personal profile according to the present invention includes the following steps: identifying a role model profile in a profile database, the role model profile including a number of parameters to be consulted to generate an on-line publication; copying the role model profile into a client profile; and saving the client profile in the profile database.

The present invention provides several advantages. For example, the task of creating a personal profile from which a personal on-line publication may be generated is greatly simplified. Consequently, the amount of time necessary to generate a personal profile is greatly reduced.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
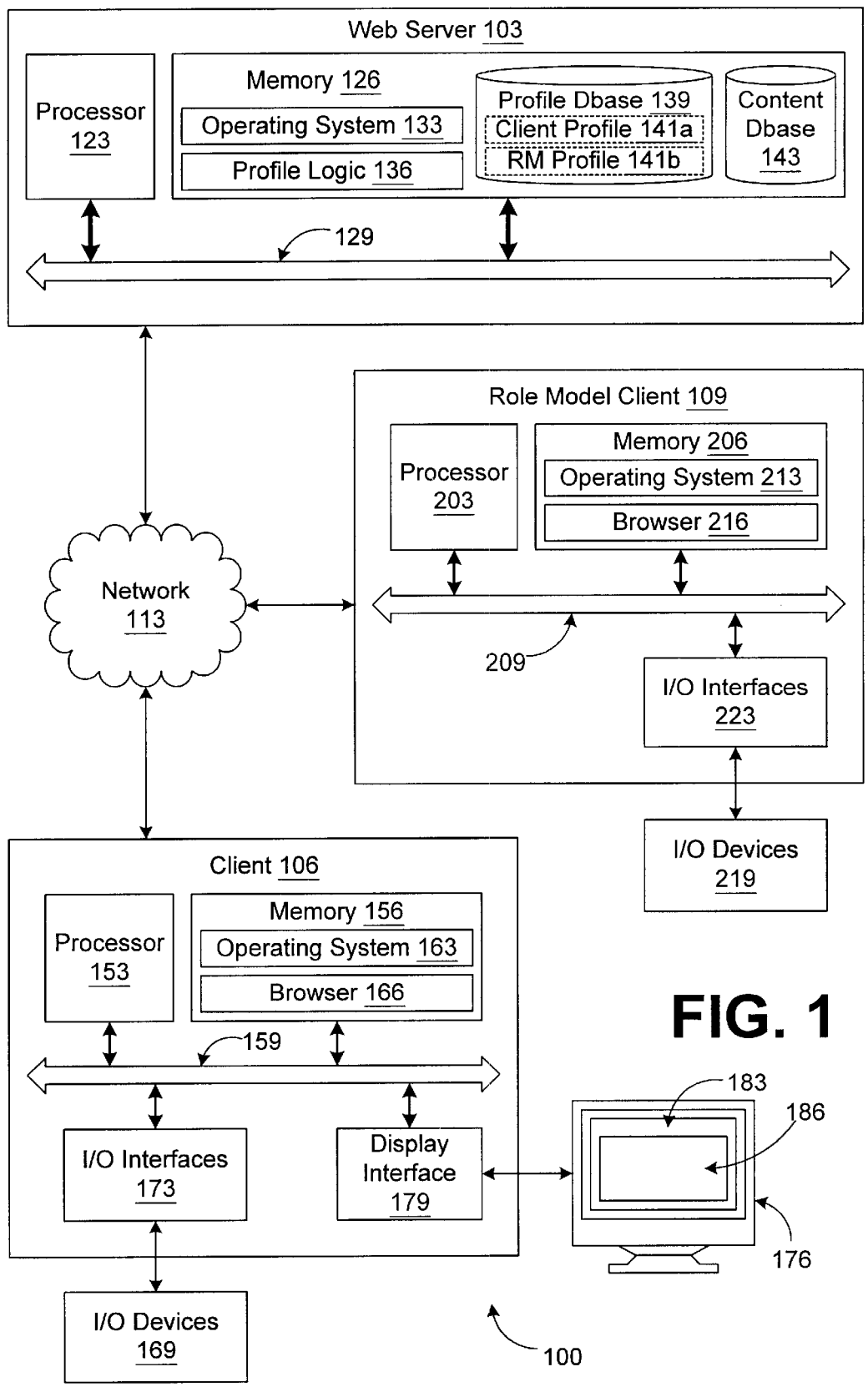
FIG. 1 is a block diagram of a network according to the present invention.

With reference to FIG. 1, shown is a profiling network 100 that includes a web server 103, a client 106, and a role model client 109. The web server 103, client 106, and role model client 109 are each coupled to a network 113. The web server 103 and the client 106 allow a user of the client 106 to generate a profile that is to be used to generate a personal publication that is transmitted from the web server 103 to the client 106. In particular, the profile of the user is created by copying a profile of a role model that is already stored on the web server 103 as will be discussed. Before an explanation of the operation of the profiling network 100 is provided, a more detailed description of the web server 103, client 106, the role model client 109, and the network 113 is provided.

The web server 103 includes a processor circuit having a processor 123 and a memory 126, both of which are coupled to a local interface 129. Stored on the memory 126 and executable by the processor 123 is an operating system 133 and profile logic 136. Also, a profile database 139 and a content database 143 are stored on the memory 126. Stored within the profile database 139 are a number of profiles, including a client profile 141a and a role model profile 141b.

The client 106 includes a processor 153 and a memory 156, both of which are coupled to a local interface 159. Stored on the memory 156 and executable by the processor 153 is an operating system 163 and a browser 166. The client 106 also includes one or more input/output devices 169 that are coupled to the local interface 159 by corresponding input/output interfaces 173. User input/output devices 169 may include, for example, but are not limited to a keypad, touch pad, touch screen, microphone, mouse, joystick, or one or more push buttons, a screen, indicator lights, speakers, printers, etc.

The client 106 also includes a display device 176 that is coupled to the local interface 159 through a display interface 179. The display device 176 may be, for example, a cathode ray tube (CRT), a liquid crystal display screen, a gas plasma-based flat panel display, indicator lights, light emitting diodes, or other suitable display device. The display interface 179 may include, for example, an appropriate video card or other suitable interface device. The input/output interfaces 173 may comprise, for example, various interface cards and or other such devices. Displayed on the display device 176 is a browser graphical user interface (GUI) 183. Within the browser GUI 183 is a profiling GUI 186. The browser GUI 183 is generated by the browser 166 stored on the memory 156 and executable by the processor 153 as is known to those of ordinary skill in the art.

The role model client 109 also includes a processor 203 and a memory 206. Both the processor 203 and the memory 206 are coupled to a local interface 209. Stored on the memory 206 and executable by the processor 203 is an operating system 213 and a browser 216. The role model client 109 also includes input/output devices 219 that are coupled to the local interface 209 through input/output interfaces 223. The input/output devices 219 are similar to the input/output devices 169 and include those devices listed above and other devices. Likewise, the input/output interfaces 223 are similar to the input/output interfaces 173.

The local interfaces 129, 159, and 209 may each include, for example, a data bus with an associated control bus that may include an address bus as is generally known by those with ordinary skill in the art. In addition, the processors 123, 153, 203 and memories 123, 153, 203 each may represent multiple processors and memories that operate in parallel. In such a case, the local interfaces 129, 159, and 209 may be an appropriate network that facilitates communication between any two of the multiple processors or between any processor and any of the memories, etc. In addition, the processors 123, 153, 203; memories 123, 153, 203; and local interfaces 129, 159, and 209 may be electrical or optical in nature. The memories 123, 153, and 203 may also be magnetic in nature.

The network 113 may be, for example, the Internet, wide area networks (WANs), local area networks, or other suitable networks, etc. The web server 103, client 106, and the role model client 109 are coupled to the network 113 to facilitate data communication to and from the network 113. These devices may be coupled to the network 113 in any one of a number of ways that are generally known by those of ordinary skill in the art. For example, the web server 103, client 106, and the role model client 109 may each be linked to the network 113 through various devices such as, for example, network cards, modems, wireless modems, or other such communications devices. Also, the web server 103, client 106, and the role model client 109 may be coupled to the network 113 through a local area network and an appropriate network gateway or other arrangements, etc.

With reference to FIGS. 2, 3, 4, and 5, next an explanation of the operation of the profiling network 100 (FIG. 1) is provided. This is done with reference to FIGS. 2–5 that show various profiling graphical user interfaces 186 (FIG. 1) that are manipulated by the client 106 in interfacing with the web server 103 to generate a profile from which a personalized on-line publication can be created. To obtain a description of a system that may be employed to generate the actual publication, reference is made to U.S. Patent Application entitled "Document Delivery System For Automatically Printing A Document On A Printing Device," filed on Jun. 7, 1999 and accorded Ser. No. 09/325,040, the entire text and disclosure of which is incorporated herein by reference.

In on-line publishing, generally it is desirable that a particular on-line publication intended for a specific individual include articles, cartoons, pictures, advertisements, and other content items that are of interest to that person. For a specific individual, there may be thousands of potential content items that may be of interest. Naturally, given the potential number of content items that could be included in a particular on-line publication, it is necessary to narrow down the number to a manageable size that can be included into a personal on-line publication for a particular user. This is done, for example, by obtaining a client profile 141a of a user that contains certain information that can be used to narrow the scope of a search through the potential content items to identify those content items that should be included within the on-line publication.

Unfortunately, it can be somewhat difficult to obtain a proper profile of a particular user that provides enough information to meaningfully limit the number of content items that the user may wish to obtain in an on-line publication. In particular, a client profile 141a is best made as extensive as possible to ensure that the number of articles ultimately chosen for a particular on-line publication is limited to a manageable number. In many cases, a user may find it tedious and difficult to provide all of the information necessary to generate a complete client profile 141a. Also, certain users may find it difficult to limit their interests in a manner in which that provides an acceptable profile. To bypass these difficulties, the present invention provides for an ability of a user to copy a profile of another user. The profile copied is the role model profile 141b. This practice rests upon the assumption that many people wish to obtain the same information as another person that they admire or look up to as a role model.

Figure 2:
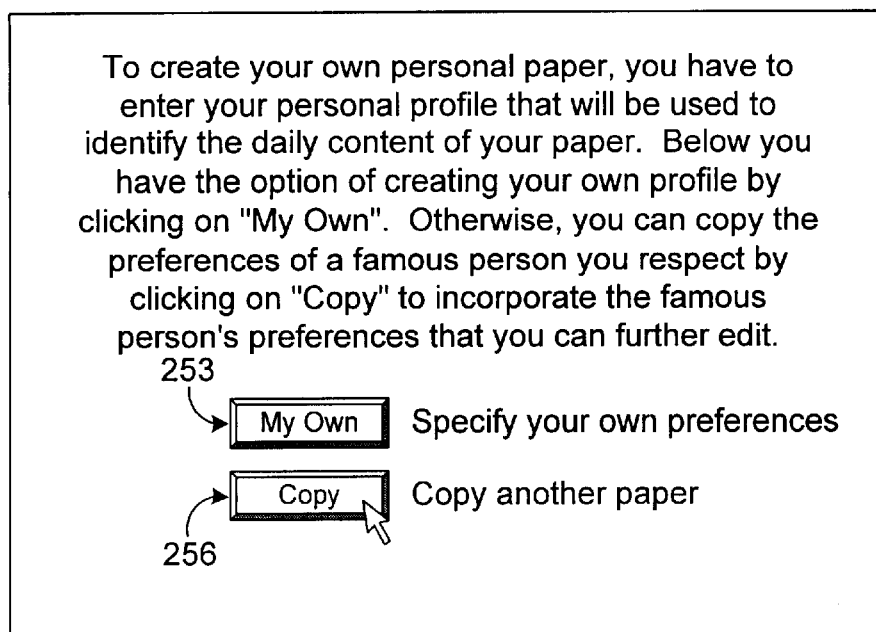
FIG. 2 is a drawing of a profile graphical user interface displayed on a client in the network of FIG. 1.

With this in mind, reference is made to FIG. 2 that shows a first profiling GUI 186a. Generally, to download the profiling GUI 186a, a user of the client 106 manipulates the browser 166 accordingly so that the profiling GUI 186a is displayed on the display device 176 (FIG. 1). In the first profiling GUI 186a, the user is prompted to create their own personal profile so that they may obtain their own personalized on-line publication. To this end, the first profiling GUI 186a includes a "My Own" button 253 and a "Copy" button 256. The user may create their own profile personally by "clicking" on the "My Own" button 253. Alternatively, in order to copy a profile from another individual that can then be altered by the user, the user may click on the "Copy" button 256. "Clicking" on a button in a particular graphical user interface is performed by manipulating a mouse (input device). This is done so that a cursor on the graphical user interface is positioned on the button and then a button on the mouse is depressed as is generally know by those with ordinary skill in the art. Such selections may also be made, for example, by other means such as by manipulating a keyboard, etc.

Figure 3:
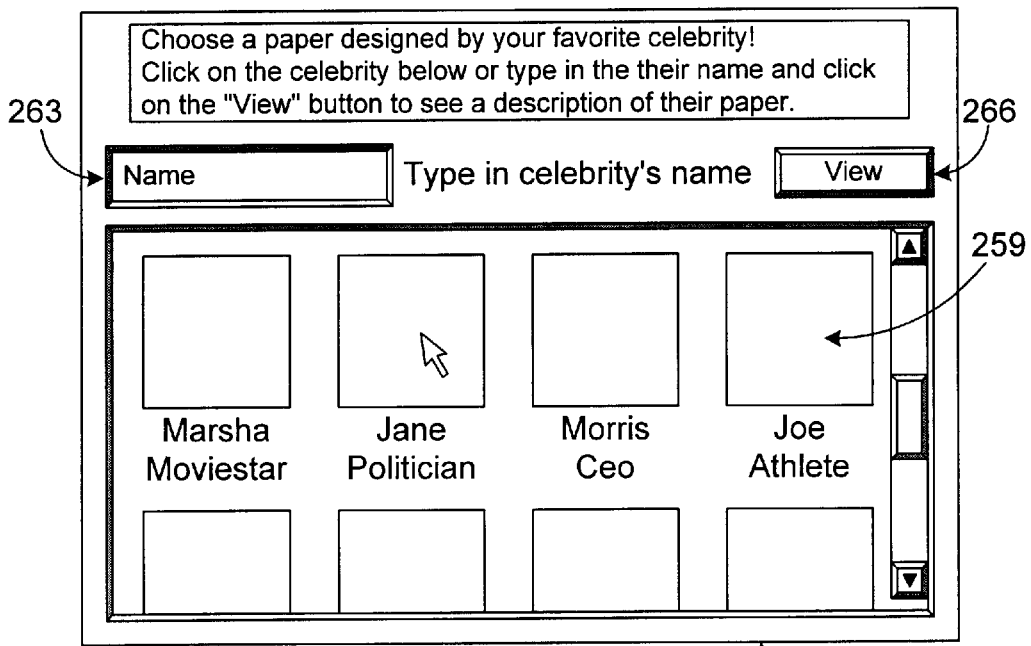
FIG. 3 is a drawing of a graphical user interface for role model selection displayed on a client in the network of FIG. 1.

With reference to FIG. 3, shown is a second profiling GUI 186b according to another embodiment of the present invention. Assuming that the user of the client 106 (FIG. 1) has clicked on the "Copy" button 256 (FIG.2), then the browser 166 (FIG. 1) downloads the second profiling GUI 186b from the web server 103 (FIG. 1). The second profiling GUI 186b posts a number of role models 259 that are illustrated by a picture with the role model's name below. The role models 259 may be, for example, famous individuals or other individuals, etc. The user may select a particular role model 259 by double-clicking thereon. In addition, the second profiling GUI 186b includes a name field 263 in which the user may type in the name of the particular role model 259. Thereafter, the user may click on the "View" button 266 to select the role model 259 that is typed in the name field 263. In these two ways, the user may specify a role model 259 whose role model profile 141b they wish to copy.

Figure 4:
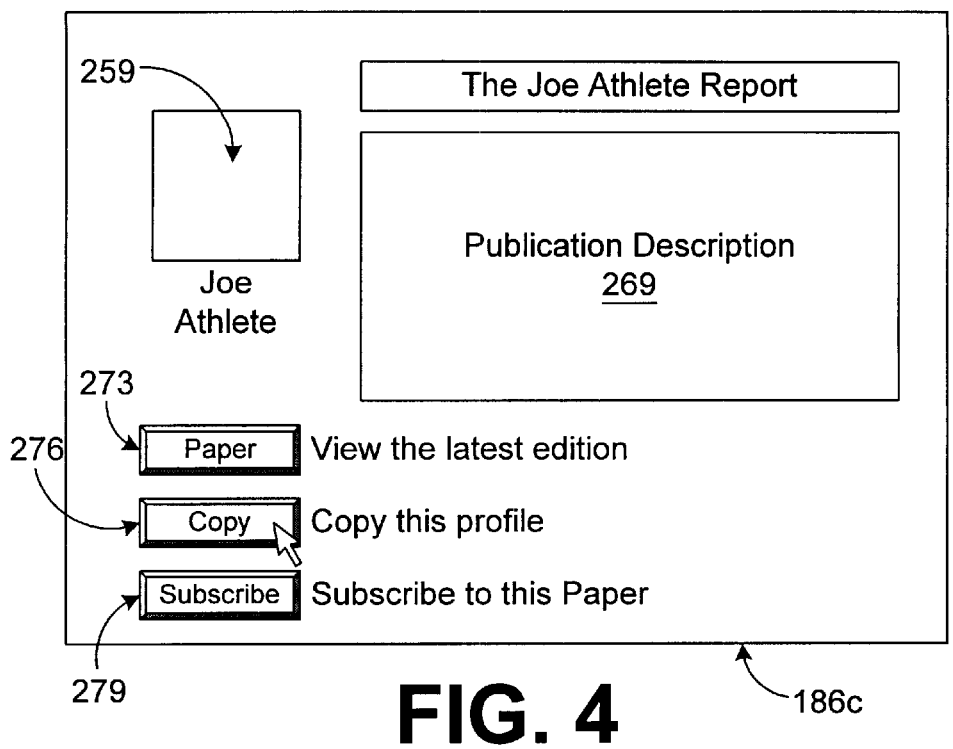
FIG. 4 is a drawing of a graphical user interface for previewing a role model paper displayed on a client in the network of FIG. 1.

With reference to FIG. 4, shown is a third profiling GUI 186c according to another aspect of the present invention. The third profiling GUI 186c includes the role model 259 as well as a publication description that describes the personal publication of the role model 259. The third profiling GUI 186c also includes a "Paper" button 273, a "Copy" button 276, and a "Subscribe" button 279. The user may click on the "Paper" button 273 in order to view the latest edition of the personalized publication of the role model 259. Also, the user may click on the "Copy" button 276 in order to copy the profile of the role model into their own personal profile. By clicking on the "Subscribe" button 279, the user may subscribe to the personal on-line publication of the role model 259 to receive it verbatim when the role model 259 receives it.

Figure 5:
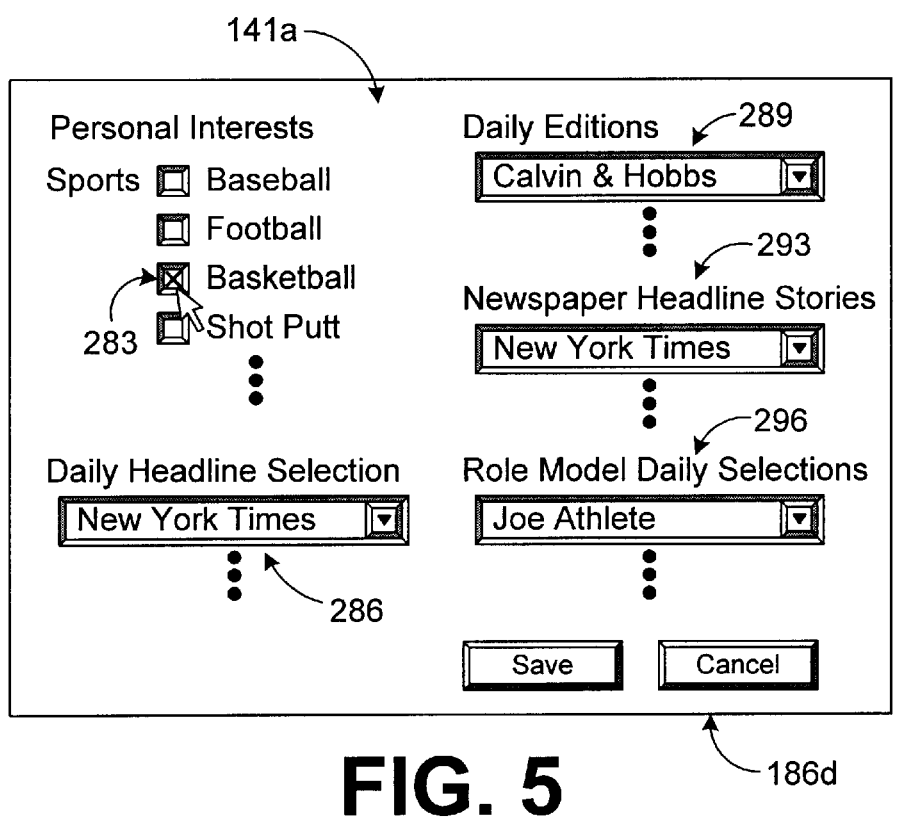
FIG. 5 is a drawing of a graphical user interface for entering a client profile displayed on a client in the network of FIG. 1.

With reference to FIG. 5, shown is a fourth profiling GUI 186d according to another aspect of the present invention. Assuming that the user has clicked on the "Copy" button 276 (FIG. 4) of the third profiling GUI 186c (FIG. 4), then the browser 166 (FIG. 1) downloads the fourth profiling GUI 186d from the web server 103. The fourth profiling GUI 186d includes a number of interest items 283, a daily headline selector 286, and a daily edition selector 289. The fourth profiling GUI 186d also includes a newspaper headline selector 293 and a role model daily selector 296. Each of the items on the fourth profiling GUI 186d is employed to obtain appropriate content items to be included in the personal on-line publication. These items represent the client profile 141a (FIG. 1) that was copied from the role model profile 141b (FIG. 1) and displayed as the client profile 141a (FIG. 1).

A description of the items is provided as follows. When selected, the interest items 283 signify a particular interest of the user. The interest items may be concentrated in various groups, such as, for example, sports, cooking, hobbies, or other such interests. It is understood that the interest items 283 as shown on FIG. 5 are simply illustrative of the various types of interest items that may be employed. In fact, the interest items 283 may involve a significant number of different interest areas and ultimately require significant input from a user to define their particular interests. The interest items may be employed, for example, in a word search to identify associated content items.

The daily headline selector 286 allows the user to receive headlines of the particular publication such as, for example, a newspaper or other such publication each day. The user may then employ the client 106 to select one or more of the headlines to be included in the daily edition of the personal on-line publication for that user.

The daily edition selector 289 allows a user to choose to receive a particular content item that is produced daily or at some other periodic time. By selecting a particular column, cartoon, or other periodic content item, the user may receive their favorite items to read in their own personal on-line publication. The newspaper headline selector 293 may specify a particular publication such as, for example, a newspaper, magazine, or other such item. Select articles or other portions of the selected publication such as headline stories are then included in the personal on-line publication. Finally, the role model daily selector 296 specifies a particular role model 259 (FIG. 4) whose daily article selections made using their own daily article selector 286 are to be included in the personal on-line publication of the user. In this manner, a user may be exposed to the specific articles that have been read by their favorite role model, etc. Note that the items of the fourth profiling GUI 186d may allow users to select multiple items by using pick-lists, menus, and/or other such mechanisms, etc.

Once the user has clicked on the "Copy" button 276 (FIG. 4) of the third profiling GUI 186c, the role model profile 141b of the particular role model 259 is displayed in the fourth profiling GUI 186d for the user as the client profile 141a. By selecting and/or typing in various items of the fourth profiling GUI 186d, the user may then alter the client profile 141a that has been copied from the role model profile 141b to suit the user's particular interests that differ from the role model 259. In this manner then, the user need not spend the time to fill in every single detail of their particular client profile 141a. Consequently, the user is significantly relieved of the tedious and time-consuming task of creating their own client profile 141a.

Figure 6:
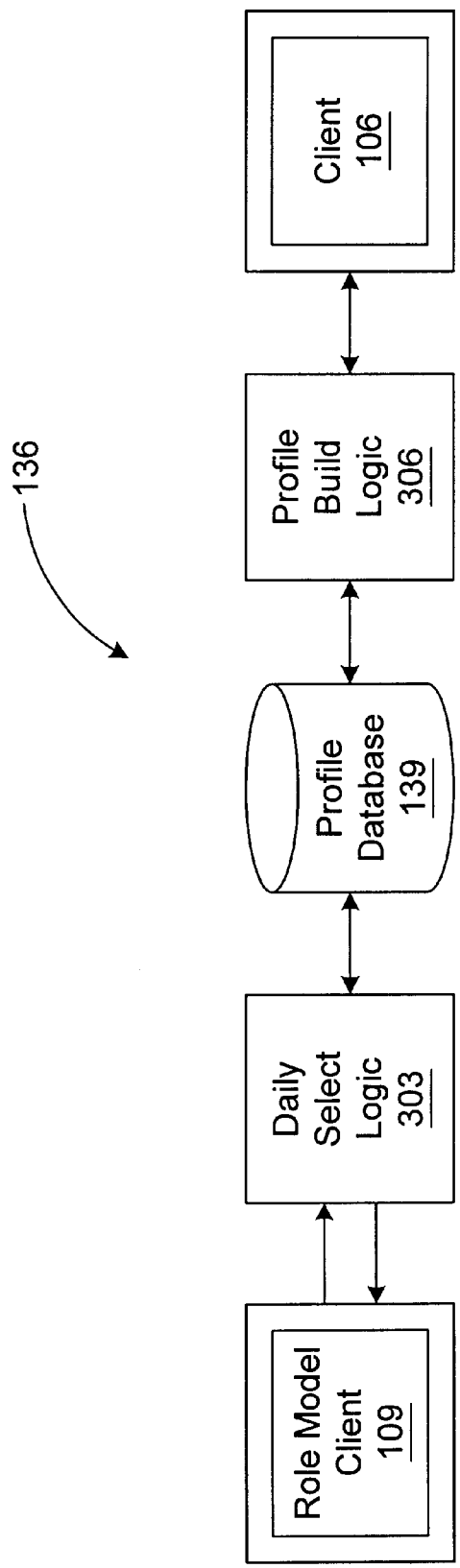
FIG. 6 is a functional block diagram of logic executed on a server in the network of FIG. 1.

With reference to FIG. 6, shown is a functional block diagram of the profile logic 136 (FIG. 1) according to an embodiment of the present invention. As shown in FIG. 6, each block represents a module, object, or other grouping or encapsulation of underlying functionality as implemented in programming code. However, the same underlying functionality may exist in one or more modules, objects, or other groupings or encapsulations that differ from those shown in FIG. 6 without departing from the present invention as defined by the appended claims.

The profile logic 136 is divided into two components, namely, daily select logic 303 and profile build logic 306. The daily select logic 303 interfaces between the role model client 109 and the profile database 139 in order to provide daily feedback from the role model client 109 relative to articles of interest as will be discussed. The profile build logic 306 interfaces between the profile database 139 and the client 106 to build the particular client profile 141a (FIG. 1) as discussed previously.

Figure 7:
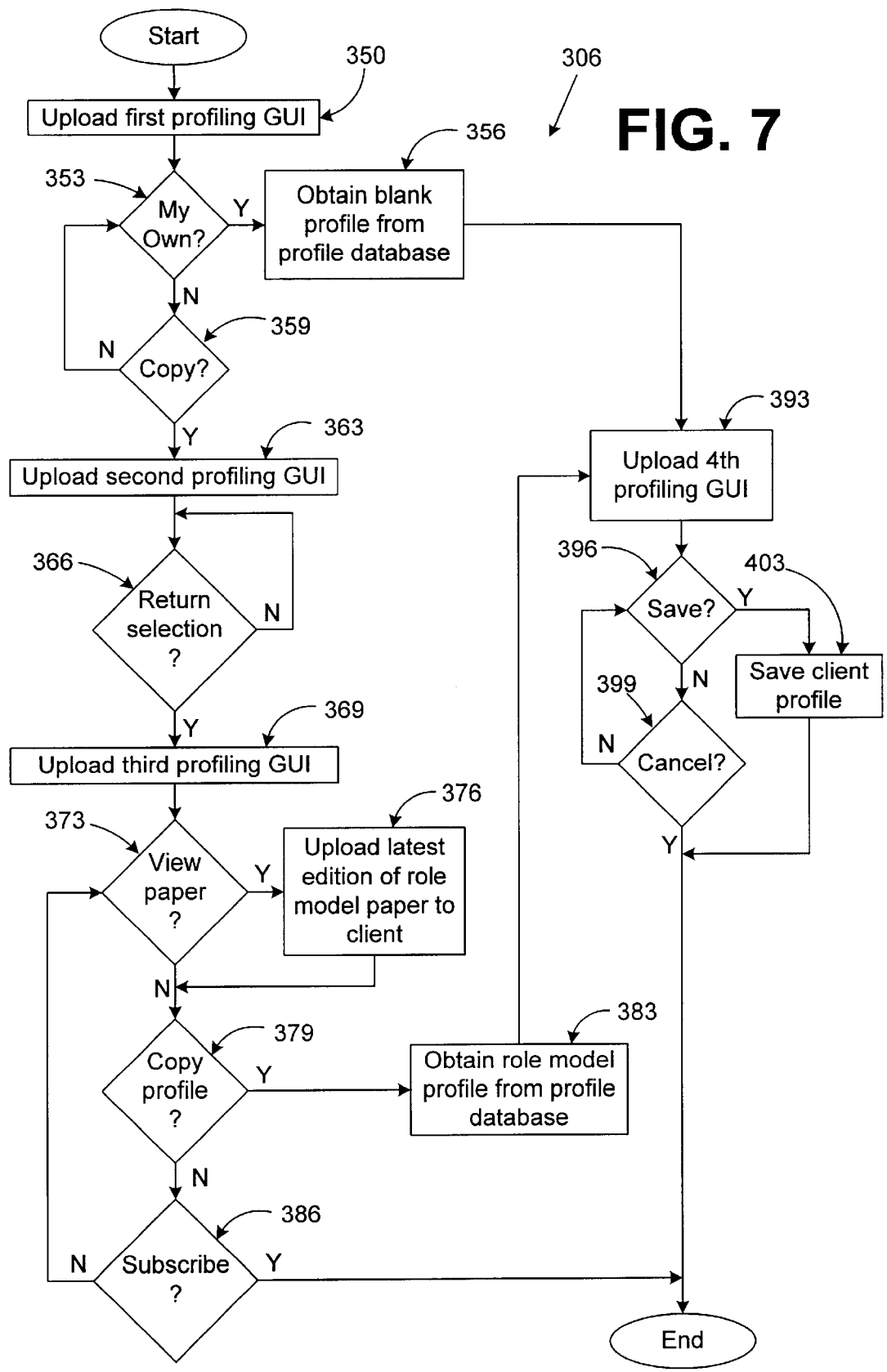
FIG. 7 is a flow chart of profile build logic executed on a server in the network of FIG. 1.

With reference to FIG. 7, shown is a flow chart of the profile build logic 306 according to an embodiment of the present invention. The profile build logic 306 is executed on the web server 103 (FIG. 1) to enable a user to copy a role model profile 141b from a role model as discussed previously. Beginning with block 350, the profile build logic 306 downloads the first profiling GUI 186a (FIG. 2) to the client 106 (FIG. 1). Thereafter, in block 353 it is determined if the user has selected the "My Own" button 253 (FIG. 2). If so, then the profile build logic 306 moves to block 356. Otherwise, the profile build logic 306 progresses to block 359. In block 356, the profile build logic 306 obtains a blank profile from the profile database 139 (FIG. 1) from which the user can create their own client profile 141a.

Assuming, however, that the profile build logic 306 progresses to block 359, it is determined whether the Copy button 256 (FIG. 2) has been clicked on by the user. If not, then the profile build logic 306 reverts back to block 353. Otherwise, the profile build logic 306 moves to block 363. Thus, after downloading the first profiling GUI 186a, the profile build logic 306 loops between blocks 353 and 359 until an appropriate response is received from the client 106.

In block 363, the profile build logic 306 downloads the second profiling GUI 186b (FIG. 3). Thereafter, in block 366, the profile build logic 306 waits to receive a role model selection from the client 106 pursuant to the second profiling GUI 186b. Assuming that a selection is received, the profile build logic 306 moves to block 369 in which the profile build logic 306 downloads the third profiling GUI 186c (FIG. 4) to the client 106.

Thereafter, in block 373 the profile build logic 306 determines whether a response has been received from the client 106 indicating that the user wishes to view the description of the role model publication by pressing the "Paper" button 273 (FIG. 4). If so, then the profile build logic 306 moves to block 376. In block 376 the latest edition of the role model's on-line publication is downloaded to the client 106. The latest edition is presented to the user in an appropriate graphical user interface that is not discussed in detail herein. While the user views the latest edition of the on-line publication, the profile build logic 306 waits to receive a return signal from the client 106 indicating that the user has finished viewing the latest edition of the role model on-line publication. Thereafter, the profile build logic 306 moves to block 379. If in block 373 the user does not indicate that they wish to view the latest edition of the role model on-line publication as evidence by failure to press the paper button 273, then the profile build logic 306 also moves to block 379.

In block 379 it is determined whether the user has depressed the "Copy" button 276 of the third profiling GUI 186c. Such action would evidence that the user desires to copy the role model profile 141b of the role model 259 (FIG. 3) that was used to generate the role model's on-line publication. If such is the case, then the profile build logic 306 moves to block 383 in which the role model profile 141b is obtained from the profile database 139 (FIG. 1). On the other hand if the "Copy" button 276 is not depressed then the profile build logic 306 moves to block 386 as shown. In block 386 it is determined whether the user wishes to subscribe to the role model on-line publication by clicking on the "Subscribe" button 279 (FIG. 4) of the third profiling GUI 186c. If such is the case, then the profile build logic 306 ends as shown. Action is then taken to subscribe to the particular on-line publication for the user. If the user does not click on the "Subscribe" button 279, the profile build logic 306 reverts back to block 373. Thus, the profile build logic 306 loops repeatedly through blocks 373, 379, and 386 until appropriate action is taken by the user and such action is received from the client 106 based on the third profiling GUI 186c.

After the profile build logic 306 obtains either a blank profile from the profile database in block 356, or obtains a role model profile 141b in block 383, then the profile build logic 306 moves to block 393. In block 393, the fourth profiling GUI 186d is downloaded to the client 106. Thereafter, the profile build logic 306 loops between blocks 396 and block 399 waiting for the user to either save the new client profile 141a copied from the role model profile 141b or to cancel the operation of the profile build logic 306. If in block 396, the profile build logic 306 receives an indication that the client profile 141a is to be saved, then the profile build logic 306 moves to block 403 in which the client profile 141a is saved to the profile database 139. Thereafter, the profile build logic 306 ends accordingly. Likewise, if in block 399 the user indicates a desire to cancel the operation, then the profile build logic 306 ends as shown. The client profile 141a is then employed to generate the personal online publication for the user pulling content items from the content database 143 (FIG. 1) and as well as from databases on other servers and devices on the network 113 (FIG. 1).

Figure 8:
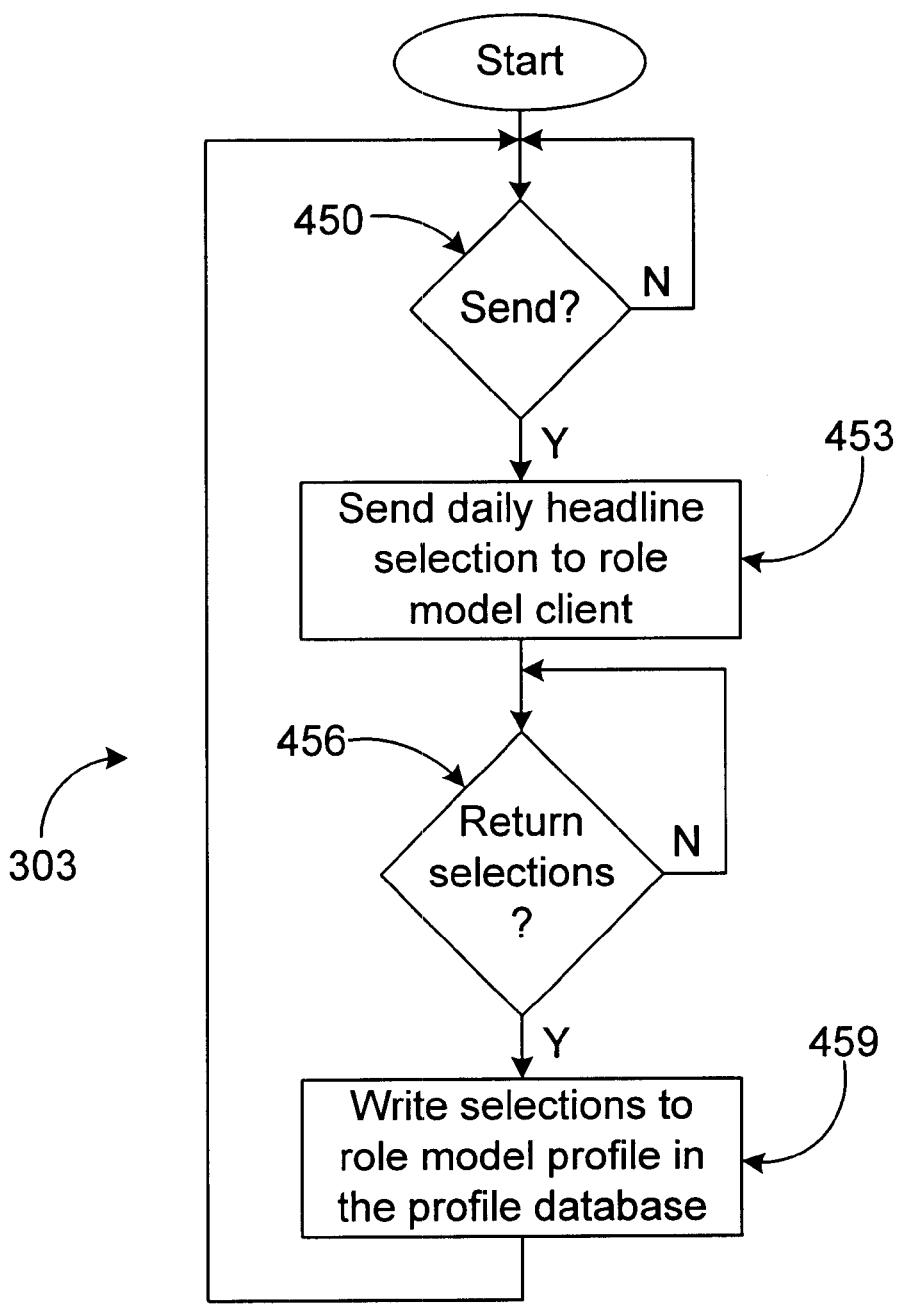
FIG. 8 is a flow chart of daily select logic executed on a server in the network of FIG. 1.

With reference to FIG. 8, shown is a flow chart of the daily select logic 303 (FIG. 6) according to another aspect of the present invention. The daily select logic 303 is executed by the web server 103 to interface with the role model client 109 to ascertain daily article selections by the role model 259 (FIG. 3). These selections are communicated to other users who have decided to copy the profile of the particular role model and have indicated an interest in their profile to receive the daily selections of the role model 259. Beginning with block 450, it is determined whether there are article headlines to send to the role model client 109 to facilitate a selection thereof by the role model. To do this, the daily select logic 303 may examine certain databases on the network 113 (FIG. 1) at certain times, for example, when articles or other content items are released for publication.

Assuming that there are particular headlines to send to the role model, the daily select logic 303 moves to block 453 in which the daily headline selection is transmitted to the role model client 109. Thereafter, in block 456 the daily select logic 303 waits to receive selections from the role model client 109. In block 459 the selections are written to the role model profile in the profile database 139 (FIG. 1). Thereafter, the daily select logic 303 reverts back to block 450 as shown. In this manner, the daily selections or preferences for various articles of one or more magazines, newspapers, or other periodicals, etc. are identified. The selections made by the role model 259 one the role model client 109 may be facilitated by appropriate graphical user interfaces that are downloaded by the browser 216 (FIG. 1) on the role model client 109.

Although the profile logic 136 (FIG. 1) of the present invention is embodied in software as discussed above, as an alternative the profile logic 136 may also be embodied in hardware or a combination of software and hardware. If embodied in hardware, the profile logic 136 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagram and/or flow charts of FIGS. 6–8 show the architecture, functionality, and operation of an implementation of the profile logic 136. If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the block diagram and/or flow charts of FIGS. 6–8 show a specific order of execution, it is understood that the order of execution may differ from that which is depicted. For example, the order of execution of two or more blocks may be scrambled relative to the order shown. Also, two or more blocks shown in succession in FIGS. 7 and 8 may be executed concurrently or with partial concurrence. It is understood that all such variations are within the scope of the present invention.

Also, the profile logic 136 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the profile logic 136 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method for generating a personal profile comprising the steps of:

downloading a user interface to a client that facilitates a selection of a role model; by a user from a plurality of posted role models, wherein the role model is an actual person admired by the user;

obtaining the selection of the role model from the client;

obtaining a role model profile associated with the role model from a profile database, the role model profile including a plurality of parameters to be consulted to generate an on-line publication;

copying the role model profile into a client profile, the client profile being associated with the user;

saving the client profile in the profile database; and downloading a second user interface to the client that allows a user to subscribe to a personal publication of the role model.

2. The method of claim 1, further comprising the steps of:

transmitting the client profile to the client to be altered by the user; and receiving the client profile from the client in a server.

3. The method of claim 1, further comprising the steps of:

periodically identifying at least one periodic content item preferred by a role model; and including the at least one periodic content item in the role model profile.

4. The method of claim 3, further comprising the step of associating the at least one periodic content item with the client profile.

5. The method of claim 3, wherein the step of periodically identifying the at least one periodic content item preferred by a role model further comprises the steps of:
   periodically transmitting a plurality of periodic content items to a role model client, the periodic content items being of potential interest to the role model; and
   receiving a selection of the at least one periodic content item from the role model client in a server, the at least one periodic content item being selected from the plurality of periodic content items.

6. A method for generating a personal profile, comprising the steps of:
   downloading a user interface to a client that facilitates a selection of a role model by a user from a plurality of posted role models, wherein the role model is an actual person admired by the user;
   obtaining the selection of the role model from the client;
   obtaining a role model profile associated with the role model from a profile database, the role model profile including a plurality of parameters to be consulted to generate an on-line publication;
   copying the role model profile into a client profile, the client profile being associated with the user;
   saving the client profile in the profile database; and
   downloading a second user interface to the client that allows the user to choose to receive a plurality of daily article selections that were selected by the role model.

7. A system for generating a personal profile, comprising:
   means for facilitating a selection of a role model by a user from a plurality of posted role models, wherein the role model is an actual person admired by the user;
   means for obtaining a role model profile associated with the role model from a profile database, the role model profile including a plurality of parameters to be consulted to generate an on-line publication;
   means for copying the role model profile into a client profile, the client profile being associated with the user;
   means for saving the client profile in the profile database; and
   means for generating and downloading a user interface to the client that allows the user to subscribe to a personal publication of the role model.

8. The system of claim 7, further comprising:
   means for transmitting the client profile to a client to be altered by the user; and
   means for receiving the client profile from the client in a server.

9. The system of claim 7, further comprising:
   means for periodically identifying at least one periodic content item preferred by a role model; and
   means for including the at least one periodic content item in the role model profile.

10. The system of claim 7, wherein the client profile further comprises means for associating the at least one periodic content item with the client profile.

11. The system of claim 7, wherein the means for periodically identifying the at least one periodic content item preferred by the role model further comprises:
    means for periodically transmitting a plurality of periodic content items to a role model client, the periodic content items being of potential interest to the role model; and
    means for receiving a selection of the at least one periodic content item from the role model client in a server, the at least one periodic content item being selected from the plurality of periodic content items.

12. A system for generating a personal profile, comprising:
    means for facilitating a selection of a role model by a user from a plurality of posted role models, wherein the role model is an actual person admired by the user;
    means for obtaining a role model profile associated with the role model form a profile database, the role model profile including a plurality of parameters to be consulted to generate an on-line publication;
    means for copying the role model profile into a client profile, the client profile being associated with the user;
    means for saving the client profile in the profile database; and
    means for generating and downloading a user interface to the client that allows a user to choose to receive a plurality of daily article selections that were selected by the role model.

13. A system for generating a personal profile, comprising:
    a processor circuit having at least one processor and at least one memory; and
    profile building logic stored on the at least one memory and executable by the at least one processor, the profile building logic comprising:
       logic to download a user interface to a client that facilitates a selection of a role model by a user from a plurality of posted role models, wherein the role model is an actual person admired by the user;
       logic to obtain a role model profile associated with the role model selected by the user from a profile database, the role model profile including a plurality of parameters to be consulted to generate an on-line publications;
       logic to copy the role model profile into a client profile, the client profile being associated with the user;
       logic to save the client profile in the profile database; and
       logic to generate and download a user interface to the client that allows the user to subscribe to a personal publication of the role model; and
    daily select logic stored in the memory and executable by the processor, the daily selected logic comprising:
       logic to periodically identify at least one periodic content item preferred by a role model; and
       logic to include the at least one periodic content item in the role model profile.

14. The system of claim 13, wherein the profile building logic further comprises:
    logic to transmit the client profile to a client to be altered by the user; and
    logic to receive the client profile from the client in a server.

15. The system of claim 13, wherein the client profile further comprises a role model identifier associating the at least one periodic content item with the client profile.

16. The system of claim 13, wherein the logic to periodically identify the at least one periodic content item preferred by the role model further comprises:
    logic to periodically transmit a plurality of periodic content items to a role model client, the periodic content items being of potential interest to the role model; and logic to receive a selection of the at least one periodic content item in the memory from the role model client, the at least one periodic content item being selected from plurality of periodic content items.

17. A system for generating a personal profile, comprising:
- a processor circuit having at least one processor and at least one memory; and
- profile building logic stored on the at least one memory and executable by the at least one processor, the profile building logic comprising;
  - logic to download a user interface to a client that facilitates a selection of a role model by a user from a plurality of posted role models wherein the role model is an actual person admired by the user;
  - logic to obtain a role model profile associated with the role model selected by the user from a profile database, the role model profile including a plurality of parameters to be consulted to generate an on-line publication;
  - logic to copy the role model profile into a client profile, the client profile being associated with the user;
  - logic to save the client profile in the profile database; and
  - logic to generate and download a user interface to the client that allows a user to choose to receive a plurality of daily article selections that were selected by the role model; and
- daily select logic stored in the memory and executable by the processor, the daily select logic comprising:
  - logic to periodically identify at least one periodic content item preferred by a role model; and
  - logic to include the at least one periodic content item in the role model profile.

* * * * *

UNITED STATES PATENT AND TRADEMARK OFFICE
CERTIFICATE OF CORRECTION

PATENT NO. : 6,684,217 B1
DATED : January 27, 2004
INVENTOR(S) : Schneider

It is certified that error appears in the above-identified patent and that said Letters Patent is hereby corrected as shown below:

Column 12,
Line 47, delete "selected" and insert therefor -- select --.

Column 13,
Line 13, delete "models" and insert therefor -- models, --.

Signed and Sealed this

Thirteenth Day of July, 2004

JON W. DUDAS
*Acting Director of the United States Patent and Trademark Office*